Figure 1:
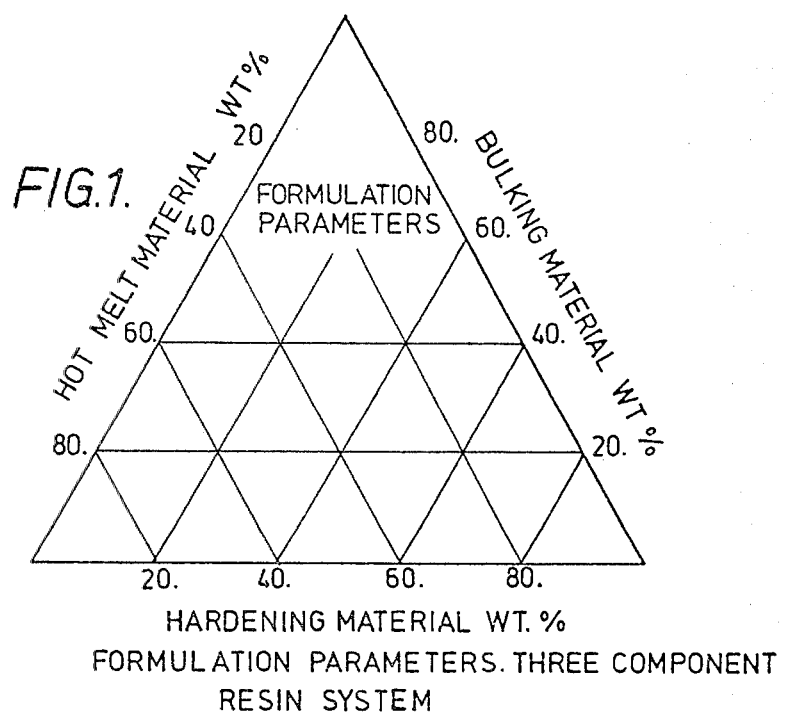

United States Patent [19]

Priest

[11] 4,304,808
[45] Dec. 8, 1981

[54] PRINTING INK

[75] Inventor: John G. Priest, London, England

[73] Assignee: Johnson, Matthey & Co., Limited, London, England

[21] Appl. No.: 780,974

[22] Filed: Mar. 24, 1977

Related U.S. Application Data

[60] Division of Ser. No. 499,043, Aug. 20, 1974, Pat. No. 4,018,728, which is a continuation-in-part of Ser. No. 334,718, Feb. 22, 1973, abandoned.

[30] Foreign Application Priority Data

Feb. 23, 1972 [GB] United Kingdom ............. 8361/72

[51] Int. Cl.³ .................... B41M 3/12; B41M 5/26
[52] U.S. Cl. .................... 428/195; 156/234; 156/240; 260/DIG. 38; 427/121; 427/123; 427/125; 427/126.3; 427/148; 428/200; 428/207; 428/208; 428/323; 428/328; 428/329; 428/511; 428/913; 428/914

[58] Field of Search ............ 106/20, 30, 32; 260/17 R, 30.8 R, 31.6, 31.8 H, 33.6 UA, 42.11, 42.22, 829, 901, DIG. 38; 427/148, 121, 123, 125, 126; 428/195, 206, 207, 208, 211, 323, 328–330, 500, 507, 511, 514, 537, 913, 914; 156/240, 234

[56] References Cited

U.S. PATENT DOCUMENTS

| | | | |
|---|---|---|---|
| 3,212,913 | 10/1965 | Mackenzie | 428/914 |
| 3,298,850 | 1/1967 | Reed et al. | 428/914 |
| 3,489,587 | 1/1970 | Weingrad | 428/914 |
| 3,533,822 | 10/1970 | Bailey | 428/512 |
| 3,589,962 | 6/1971 | Bonjour | 156/240 |
| 3,894,167 | 6/1975 | Kluge et al. | 428/40 |
| 3,987,225 | 10/1976 | Reed et al. | 428/43 |
| 4,021,591 | 5/1977 | De Vries et al. | 428/200 |
| 4,027,345 | 6/1977 | Fujisawa et al. | 8/2.5 A |

Primary Examiner—Bruce H. Hess
Attorney, Agent, or Firm—Cushman, Darby & Cushman

[57] ABSTRACT

The invention relates to a printing ink formulation for producing a transferable layer comprising a pigmentary material or a material possessing predetermined electrical properties, a hot melt adhesive, a solid phase plasticizer and a solvent.

15 Claims, 3 Drawing Figures

FORMULATION PARAMETERS. THREE COMPONENT RESIN SYSTEM

FORMULATION PARAMETERS. THREE COMPONENT RESIN SYSTEM

FORMULATION PARAMETERS. PLASTICISER/RESIN

HEAT ACTIVATION SCHEDULE FOR INKS.

PRINTING INK

This is a division of application Ser. No. 499,043, filed Aug. 20, 1974, and now U.S. Pat. No. 4,018,728, which is a continuation-in-part of Ser. No. 334,718, filed Feb. 22, 1973, now abandoned.

This invention relates to a printing ink and especially to such an ink for the printing of the design layers of transfers or decalcomanias for the application of decorative and other designs or of material possessing desired electrical properties to heat resistant bases.

Such bases include pottery, glass, metal, and the like as well as fused alumina and ceramic chips of the type used in the manufacture of electronic components.

Several types of transfers are known in the art but all suffer from one disadvantage or another. For example, the well-known water slide-off or solvent released types of transfers do not lend themselves to mechanical application and have to be applied individually and carefully by hand. This is time consuming and expensive and is a considerable disadvantage when large numbers of mass produced articles require to be transfer-decorated.

Self-adhesive or pressure sensitive transfers, although in principle suitable for mechanical application, have the disadvantage that the adhesive surfaces readily become contaminated with dust and small particles of paper and the like as a result of the tackiness of the surfaces. Transfers of this type are also prone to "blocking" or "cohesion" in which stacked sheets of transfers, ready for use, stick together. The same difficulty arises when stacked sheets of transfers of this type are guillotined or die-cut.

Further, transfers of the type which need to be activated by heat so that the transferable design layer is adhesive only at elevated temperatures, suffer from the serious disadvantage that they need to be applied to heated substrates such as heated glass or ceramic ware. This is disadvantageous because of the cost and inconvenience of heating the ware immediately prior to the application of the transfers, and the difficulty of handling heated bodies. Very occasionally, it is possible to avoid special heating of the ware and to apply such transfers to the ware at some stage towards the end of its manufacture when it is still hot. Even this, however, is markably disadvantageous in that, apart from the difficulties of handling heated bodies, the operator is compelled to apply the transfers at a particular stage in the manufacture of the ware and is unable to apply the transfers at the most convenient stage.

It is an object of this invention to provide a decalcomania or like transfer and a printing ink therefor which combines the benefits of a heat-activatable thermoplastic ink and a pressure sensitive adhesive.

According to one aspect of this invention, a printing ink formulation for producing a transferable layer in the manufacture of a transfer comprises a material having pigmentary or electrical properties, a hot-melt adhesive, a solid phase plasticiser and a solvent.

According to another aspect of this invention, a printing ink formulation for producing a transferable layer comprises a material having pigmentary or electrical properties, a hot-melt adhesive selected from the group consisting of acrylic polymers and copolymers, a solid phase plasticiser and a solvent, the solvent being selected from the group consisting of aliphatic hydrocarbon solvents and mixtures of aliphatic and aromatic hydrocarbon solvents, and the plasticiser being one which has a melting point falling within the range of 60° C. to 90° C. and which is substantially completely insoluble in aliphatic hydrocarbon solvents and only partially soluble in aromatic hydrocarbon solvents.

The invention also includes a transfer for the application to a heat-resistant substrate of a design formed of pigmentary material, which includes a layer comprising the said pigmentary material, a hot-melt adhesive and a solid phase plasticiser.

The hot-melt adhesive above referred to may be modified by incorporating therein a hardening and de-tack resin and/or a bulking resin.

The invention also includes a transfer for the application of a design to a heat resistant substrate, which transfer has a design layer possessing pigmentary or electrical properties, and a tack-free, hot-melt adhesive, activatable by heat, forming at least a part of one surface of the said design layer.

A transfer in which the design layer has been printed using an ink according to the invention combines the advantages of a transfer in which the design layer on the one hand comprises a conventional heat-activatable thermoplastic ink and, on the other hand, has a pressure sensitive adhesive layer, in that the ink according to the invention remains tack-free until activated by heat and, after such activation, retains its tackiness for a predetermined period.

The transfer of the invention is suitable both for manual and mechanical application; it is heat-activated but the ware to which it is to be applied need not be hot and it has a minimum pre-determinable temperature of activation below which temperature the transferable layer is not adhesive but at or above the said temperature, at least the free surface of the layer will become adhesive and moreover, after activation, will retain its adhesive property for a considerable period even when cold. Further, since the ink in such a transfer is stable at temperatures below the activation temperature, the transfer is not subject to deterioration with age and consequently has a virtually indefinite shelf life.

The ink may be printed on any of the conventional dry release papers known in the art such as silicone coated, wax coated, paper/polythene laminates, chrome complex coated and the like. The ink layer may be formulated to be inert up to a temperature of about 80° C., and when printed on to a release substrate does not require interleaving during storage as does a conventional pressure sensitive adhesive.

To assist in obtaining a well defined pattern in a transfer and particularly where the pattern includes fine lines, a thin layer of a rupture lacquer is applied to the coated release paper. The rupture lacquer may be made from an acrylic resin such as n-butyl methacrylate or a cellulosic material such as ethyl cellulose dissolved in a suitable solvent. The layer of rupture lacquer is, conveniently, roller coated on to the aforesaid pre-coated release paper. In practice, we have found that the ink wets the layer of rupture lacquer more readily than, for example, the silicone layer on the release paper and consequently fine ink lines applied to the layer of rupture lacquer possess higher mechanical stability.

The ink layer itself becomes an adhesive when activated by heat and may remain tacky for a predetermined period depending on the choice of the material selected to form the ink system.

The pigmentary material may comprise any of the usual ceramic colours which are well-known to those skilled in the art. These colours are generally transition metals and metals of the sub-groups IIIA, IVA, VA and VIA of the periodic classification, using the American convention. The colours, therefore may include metals such as titanium, vanadium, chromium, manganese, iron, cobalt, nickel, copper, zinc, gallium, germanium, arsenic, selenium, zirconium, molybdenum, ruthenium, rhodium, palladium, silver, cadmium, indium, tin, antimony, cerium, tungsten, iridium, platinum, gold, mercury, thallium, lead and bismuth, and these may be used as the element or as a compound. Some typical colouring compounds are chromates, phosphates, molybdates, selenides, tungstates, borates, ferrites, oxides, sulphides and spinels.

The hot-melt adhesive comprises a high viscosity, high tack resin, having a hot-melt viscosity range, for example, between 1200 and 200 poises within a temperature range of 100° C. to 160° C. respectively. It may comprise an acrylic polymer such as butyl methacrylate or a co-polymer such as butyl methacrylate/butyl acrylate or 2-ethyl hexyl acrylate/vinyl acetate.

The hardening and de-tack resin which may be added to the hot-melt adhesive, functions to de-tack said hot-melt component in the unreacted state i.e. during the "print-life" of the layer prior to heat activation. By "print-life" is meant the interval between the printing of the layer and its application to a substrate. The selected resin must be compatible with the other components of the ink, must burn away cleanly leaving no carbon residue, must have good solvent release, must screen satisfactorily and must be virtually tack-free even at elevated ambient temperatures.

Resins having the desired physical properties are "Plexigum P24", which is a n-butyl methacrylate resin manufactured by Rohm and Haas of Germany, and "Neocryl B731", which is an isobutyl methacrylate resin manufactured by PolyVinyl Chemie of Holland. Cellulosic materials and in particular nitrocellulose have also been found to exhibit the desired properties.

The bulking resin, which may be added to the hot-melt adhesive, serves to maintain the solids content of the adhesive at a high value without seriously influencing the overall viscosity. As with the hardening resin, it must be compatible with other components, must burn away cleanly without carbon residue, must have good solvent release, and must screen satisfactorily. In addition, the resin must be tack-free at ambient temperatures. It has been found that cyclic ketone resins such as "MS2" and "MC2" marketed by Laporte Industries Ltd., terpene resins such as "Crex" resins "B85" and "B115" marketed by Rex Campbell & Co Ltd., and hydrogenated resins such as "Staybelite Ester 3" marketed by Hercules Inc. are suitable as bulking resins. The "MS2" and "MC2" cyclic ketone resins have typical analyses as indicated in the following tables:

| RESIN "MS2" | |
|---|---|
| Appearance | Pale straw coloured, brittle, solid |
| Colour, Lovibond Standard 2 in. cell 25g Resin in 50 ml SBP6, max. | 0.5 Red 1.5 Yellow |
| Softening point, min. °C. (ball and ring) | 85 |
| Acid value | Practically nil |
| Density (av.) | 1.08 |
| Refractive index $n_D^{20}$ | 1.5045–1.5050 |

| RESIN "MC2" | |
|---|---|
| Appearance | Very pale clear, brittle solid |
| Colour, Lovibond Standard 2 in. cell 25g Resin in 50 ml SBP6, max. | 0.5 Red 1.5 Yellow |
| Softening point min.°C. (ball and ring) | 85 |
| Hydroxyl value | 150 approximately |
| Density (av.) | 1.12 |
| Refractive index $n_D^{20}$ | 1.531 |

The three component resins may be formulated into an ink vehicle by dissolving in a solvent system such as an aliphatic/aromatic hydrocarbon blend or an aliphatic/ester solvent blend. The proportions in which the three resins are blended will depend upon the characteristics desired in the final ink. The tertiary graph FIG. 1, illustrates the area of combination of the three components producing optimum performance properties. The solvent may be either wholly aliphatic or a mixture of aliphatic and aromatic solvents containing up to 40 wt% of aromatic solvent. For example, white spirit and Solvesso 150 have been found to be suitable. Alternatively, the solvent may be a blend of aliphatic and ester solvent containing up to 25 wt% of ester solvent in the blend, such as white spirit and 2-ethoxy ethyl acetate. Butyl lactate is also a suitable ester solvent. Preferably the resins are formulated into a vehicle giving a resin solids content of between 30% and 45%.

Obviously other materials which behave in a manner similar to any one of these component resins may be used providing that their burning characteristics are substantially similar.

The ink basically consists of four components, namely, a pigmentary material which is to be understood to include a material possessing desired electrical properties, the resin complex above mentioned which includes the hot-melt adhesive with or without one or both of the other resin, a solid phase plasticiser and a solvent. The plasticiser should be so chosen as to be only partially soluble in the solvent blend so as to maintain the plasticity of the ink during its "printing life" with the bulk of the plasticiser being dispersed within the ink as discreet particles. On removal of solvent by evaporation, the printed layer is stable and tack-free and includes pigment, resin and plasticiser.

Figure 2:
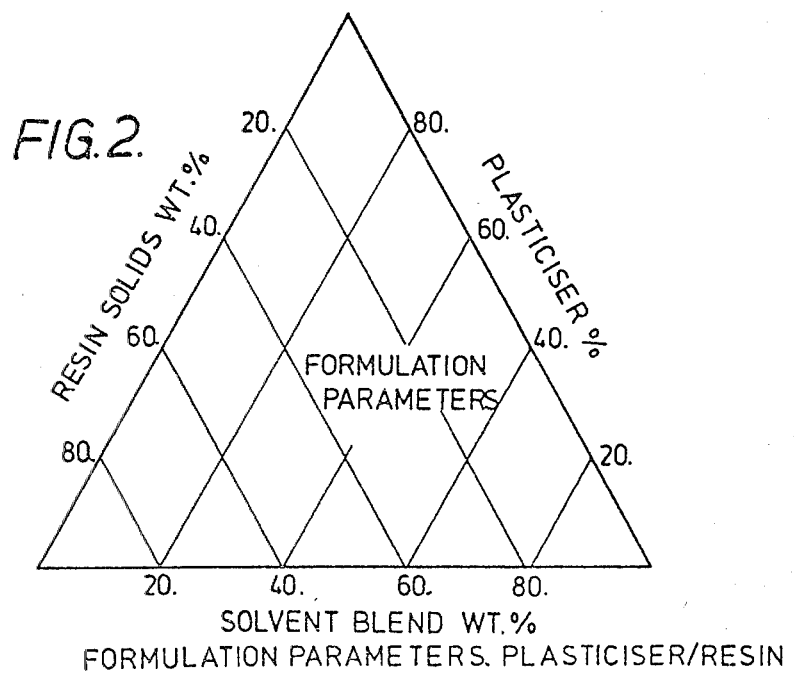

The resin and plasticiser should be mutually compatible so that on the application of heat they combine to provide a high tack surface on the ink, the degree and duration of the tack being dependent on the formulation of the resin complex. The optimum areas of percentage combination of plasticiser, resins and solvent blend are illustrated in the tertiary graph FIG. 2. Within the limits shown an ink with the desired properties can be produced.

The plasticisers selected must be in the solid phase and should melt between 60° and 90° C. They should be (substantially) completely insoluble in aliphatic hydrocarbon solvents and only partially soluble in aromatic hydrocarbon and ester solvents. In the formulation of heat-activatable inks, cyclohexyl-p-toluene sulphonamide MP86° C. and dicyclohexyl-phthalate MP62.6° C. have been used but other solid phase plasticisers that follow closely the above specification are equally suitable, such as tri-methylolethane tri-benzoate, neopentyl glycol di-benzoate, pentaerythritol tetra-benzoate and glycerol tri-benzoate.

The inks can be printed using the silk screen process on to any of the conventional dry release papers and dried by the evaporation of the solvents.

The following examples show some typical formulations.

EXAMPLE 1

Glass or Pottery Screen Printing Ink

| | % By Weight |
|---|---|
| Pigmentary Material | 62.5 |
| 2-Ethyl Hexyl Acrylate/Vinyl Acetate (Adhesive) | 5.0 |
| Plexigum P24 (Hardening and de-tack resin) | 2.5 |
| MC.2 (Bulking resin) | 2.5 |
| Cyclohexyl-p-toluene sulphonamide (Plasticisers) | 12.5 |
| White Spirit (Solvent) | 9.0 |
| Solvesso 150 (Solvent) | 6.0 |
| | 100.0 |

EXAMPLE 2

Glass or Pottery Screen Printing Ink

| | % By Weight |
|---|---|
| Pigmentary Material | 53.8 |
| Butyl Methacrylate (Adhesive) | 10.2 |
| MS.2 (Bulking resin) | 5.1 |
| Dicyclo-hexyl-phthalate (Plasticiser) | 15.45 |
| White Spirit (Solvent) | 15.45 |
| | 100.0 |

EXAMPLE 3

Glass or Pottery Screen Printing Ink

| | % By Weight |
|---|---|
| Pigmentary Material | 54.0 |
| 2-Ethyl Hexyl Acrylate/Vinyl Acetate (Adhesive) | 9.2 |
| Plexigum P24 (Hardening and de-tack resin) | 1.5 |
| Staybelite Ester 3. (Bulking resin) | 0.7 |
| Cyclohexyl-p-toluene sulphonamide (Plasticiser) | 13.7 |
| White Spirit (Solvent) | 15.9 |
| Butyl Lactate (Solvent) | 5.0 |
| | 100.0 |

EXAMPLE 4

Glass Screen Printing Ink

| | % By Weight |
|---|---|
| Pigmentary Material | 58 |
| Butyl Methacrylate/Butyl Acrylate (Adhesive) | 11.3 |
| ICI. Nitrocellulose HX 3/5 (Hardening and de-tack resin) | 0.7 |
| Cyclohexyl-p-toluene-Sulphonamide (Plasticiser) | 10.6 |
| White Spirit (Solvent) | 15.5 |
| Butyl Lactate (Solvent) | 3.9 |
| | 100.0 |

EXAMPLE 5

Pottery Screen Printing Ink—High pigment content

| | % By Weight |
|---|---|
| Pigmentary Material | 67.00 |
| 2-Ethyl Hexyl Acrylate/Vinyl Acetate (Adhesive) | 4.4 |
| Crex Resin B85 (Bulking resin) | 2.2 |
| Dicyclo-hexyl-phthalate (Plasticiser) | 11.0 |
| White Spirit (Solvent) | 9.2 |
| Solvesso 150 (Solvent) | 6.2 |
| | 100.0 |

EXAMPLE 6

Pottery Screen Printing Ink—Low pigment content

| | % By Weight |
|---|---|
| Pigmentary Material | 42.5 |
| 2-Ethyl Hexyl Acrylate/Vinyl Acetate (Adhesive) | 13.5 |
| Neocryl B731 (Hardening and de-tack resin) | 3.5 |
| Neopentyl Glycol Dibenzoate (Plasticiser) | 15.0 |
| White Spirit (Solvent) | 15.3 |
| Solvesso 150 (Solvent) | 10.2 |
| | 100.0 |

EXAMPLE 7

Underglaze Screen Printing Ink—High pigment content

| | % By Weight |
|---|---|
| Pigmentary Material | 64.5 |
| Butyl Methacrylate/Butyl Acrylate (Adhesive) | 8.5 |
| Dicyclo-hexyl phthalate (Plasticiser) | 14.0 |
| White Spirit (Solvent) | 13.0 |
| | 100.0 |

EXAMPLE 8

Underglaze Screen Printing Ink—Low pigment content

| | % By Weight |
|---|---|
| Pigmentary Material | 42.8 |
| 2-Ethyl Hexyl Acrylate/Vinyl Acetate (Adhesive) | 14.8 |
| Plexigum P24 (Hardening and de-tack resin) | 2.1 |
| Dicyclohexyl-p-toluene sulphonamide (Plasticiser) | 14.8 |
| White Spirit (Solvent) | 15.3 |
| Solvesso 150 (Solvent) | 10.2 |
| | 100.0 |

Figure 3:
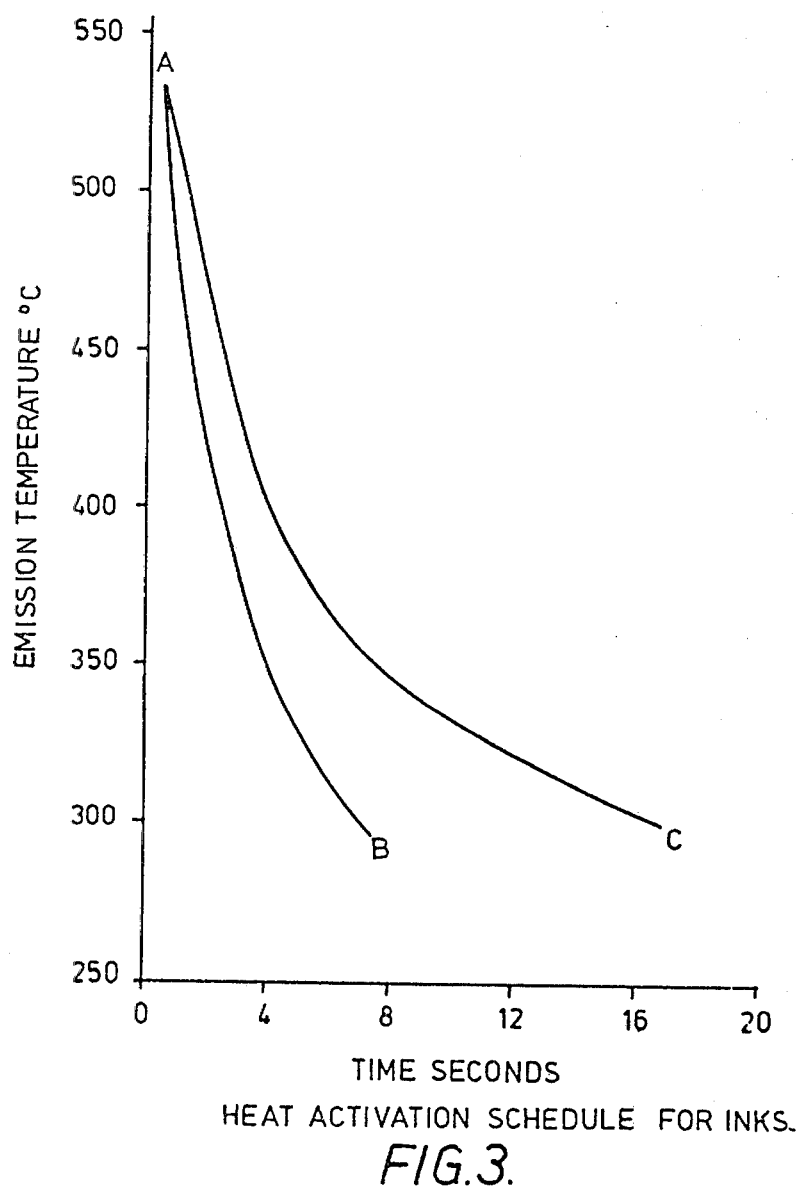

When the transfer is to be applied to the substrate, the ink is subjected to heat for a period of time until the ink layer is converted from a dry tack-free ink to a high-tack pigmented film. This is in general achieved by holding the transfer above a heating block or by passing it over a heated platen for a short time, usually amounting to five seconds or less. While the transfer cools quickly it normally retains its activity for a period of the order of 48 hours. The minimum activation surface temperature for the adhesive incorporated in design layers printed from ink described in the preceding examples may well be in the region of 150° C. but, in general, the range of activation temperatures would be from 80° C. to 200° C. FIG. 3 illustrates within the area of the curve suitable conditions of time and temperature for the activation of the ink films as characterised by the examples. Below the curve AB the ink film is insufficiently activated whilst above the curve AC the ink film is over-activated.

When the activated transfer is applied to, and consequently adheres to a substrate, the low bond strength between the tacky design layer and the dry release paper enables the latter to be readily removed to leave the design layer firmly fixed to the heat resistant substrate and ready for a firing step.

What is claimed is:

1. A decalcomania or transfer comprising a release backing layer having thereon a transferable design layer formed of printing ink, wherein the ink is constituted so as to remain tack-free until activated by heat and to retain its tackiness for a predetermined period after said activation, said printing ink comprising a metal selected from the group consisting of transition metals and metals of the sub-groups IIIA, IVA, VA and VIA of the periodic classification, a hot melt adhesive selected from acrylic polymers and copolymers, a solid phase plasticizer which has a melting point falling within the range of 60° C. to 90° C. and which is substantially completely insoluble in aliphatic hydrocarbon solvents and only partially soluble in aromatic hydrocarbon solvents and a solvent, the solvent being selected from the group consisting of aliphatic hydrocarbon solvents and mixtures of aliphatic and aromatic hydrocarbon solvents containing up to 40 wt.% of aromatic solvent, the solvent having been removed by evaporation.

2. A transfer comprising a release backing layer having a transferable design layer thereon formed of a printing ink comprising a material having pigmentary or electrical properties and which is an element or a compound comprising a metal selected from the group consisting of transition metals and metals of the sub-groups IIIA, IVA, VA and VIA of the periodic classification, a hot melt adhesive selected from the group consisting of acrylic polymers and copolymers, a solid phase plasticizer and a solvent, the solvent being selected from the group consisting of aliphatic hydrocarbon solvents and mixtures of aliphatic and aromatic hydrocarbon solvents containing up to 40 wt.% of aromatic solvent, and the plasticizer being one which has a melting point falling within the range of 60° C. to 90° C. and which is substantially completely insoluble in aliphatic hydrocarbon solvents and only partially soluble in aromatic hydrocarbon solvents, the solvent having been removed by evaporation.

3. A transfer for the application of a design of a material having pigmentary or electrical properties to a heat resistant substrate, comprising a release backing sheet having thereon a layer which includes, in addition to said material, a hot melt adhesive and a solid phase plasticizer wherein the said material comprises a metal selected from the group consisting of transition metals and metals of the sub-groups IIIA, IVA, VA and VIA of the periodic classification, the hot melt adhesive is selected from acrylic polymers and copolymers, and the solid phase plasticizer is one which has a melting point falling within the range of 60° C. to 90° C. and which is substantially completely insoluble in aliphatic hydrocarbon solvents and only partially soluble in aromatic hydrocarbon solvents.

4. A transfer according to claim 3, including a layer of a rupture lacquer applied to the release backing sheet prior to application of the material having pigmentary or electrical properties.

5. A transfer according to claim 4, wherein the rupture lacquer is a resin selected from the group consisting of n-butyl methacrylate and cellulosic materials.

6. A transfer according to claim 3, wherein the release backing sheet is a dry release sheet selected from the group consisting of silicone coated sheets, wax coated sheets, paper/polythene laminates and chrome complex coated papers.

7. A transfer according to claim 3 wherein the hot melt adhesive additionally includes a hardening and de-tack resin selected from the group consisting of butyl methacrylate resins and nitrocellulose.

8. A transfer according to claim 7 wherein the hot melt adhesive additionally includes a bulking resin selected from the group consisting of cyclic ketone resins, terpene resins and esters of hydrogenated rosin.

9. A transfer according to claim 8 wherein the bulking resin comprises a cyclic ketone condensation product resin having an average mol. wt. of 700.

10. A transfer according to claim 7 wherein the hardening and de-tack resin comprises an n-butyl methacrylate resin.

11. A transfer according to claim 3 wherein the melt adhesive comprises a high viscosity high tack acrylic resin having a hot melt viscosity range of between 1200 and 200 poises within a temperature range of 100° to 160° C.

12. A transfer according to claim 3 wherein the hot melt adhesive comprises pressure sensitive acrylic copolymer 2-ethyl-hexyl acrylate/vinyl acetate.

13. A transfer according to claim 3 wherein said layer comprises a material having pigmentary or electrical properties which is an element or compound comprising a metal selected from the group consisting of titanium, vanadium, chromium, manganese, iron, cobalt, nickel, copper, zinc, gallium, germanium, arsenic, selenium, zirconium, molybdenum, ruthenium, rhodium, palladium, silver, cadmium, indium, tin, antimony, cerium, tungsten, iridium, platinum, gold, mercury, thallium, lead and bismuth, a hot melt adhesive comprising butyl methacrylate homopolymer, butyl methacrylate/butyl acrylate copolymer or 2-ethyl hexyl acrylate/vinyl acetate copolymer, and a solid phase plasticizer selected from the group consisting of cyclohexyl-p-toluene sulphonamide, dicyclohexyl-phthalate, trimethylolethane tri-benzoate, neopentyl glycol di-benzoate, pentaerythritol tetrabenzoate and glycerol tribenzoate.

14. A transfer according to claim 3 wherein said material is used in elemental metal form.

15. A transfer according to claim 3 wherein said material is a compound selected from the group consisting of chromates, phosphates, molybdates, selenides, tungstates, borates, ferrites, oxides, sulphides and spinels.

* * * * *